Patented June 23, 1936

2,045,125

UNITED STATES PATENT OFFICE 2,045,125

ANESTHETIC SOLUTIONS

David Curtis, New York, N. Y.

No Drawing. Application October 19, 1935,
Serial No. 45,779

13 Claims. (Cl. 167—52)

The present invention relates to anesthetic solutions, and more particularly to such solutions which contain as the active anesthetic ingredient the acetyl-salicylates of the alkyl esters of p-amino-benzoic acid.

In my copending application entitled "Surface anesthetics", filed September 24, 1935, Serial No. 41,872, I have described an anesthetic substance dissolved in an emolient medium in the presence of aspirin and an alcohol, and have fully described the uses and advantages inherent in that type of an anesthetic because of the emolient properties of the solvent and the presence of the aspirin.

The present invention is directed to a specific solvent for aspirin and an anesthetic which does not require the addition of an alcohol to effect and maintain a stable solution, and which may serve as a solvent for an entire group of anesthetics in combination with aspirin.

In my above mentioned copending application I pointed out that benzocaine and aspirin, though not soluble by themselves in glycerine, become soluble in glycerine in the presence of one another and of an alcohol.

I have now found, however, that when glycol, (ethylene glycol—$HOCH_2.CH_2OH$) is used as the solvent, in which neither benzocaine nor aspirin are by themselves soluble to any appreciable extent or for any length of time, the benzocaine and aspirin become appreciably soluble in substantially stable solution, merely in the presence of each other without requiring the addition of an alcohol.

I have also found that glycol will not only act as a solvent for benzocaine in the presence of aspirin, but will dissolve other alkyl esters of p-amino benzoic acid, such as propyl-p-amino benzoate and butyl-p-amino-benzoate, in the presence of aspirin, without the addition of an alcohol.

All the alkyl esters of p-amino-benzoic acid ($C_6H_4NH_2.COO.R$) form, in solution, salts with acetyl-salicylic acid, in the same manner as the benzocaine, as pointed out in the above entitled copending application. These acetyl salicylic acid salts of the alkyl-p-amino benzoates may be prepared in ready made form by dissolving the reactants in their molecular proportions in some volatile organic solvent, such as acetone, driving off the solvent and crystallizing therefrom.

Thus, 179 grams of propyl-p-amino benzoate ($C_6H_4NH_2.COO.C_3H_7$) plus 180 grams of acetyl salicylic acid [$C_6H_4O.(CH_3.CO)COOH$], dissolved in a suitable volume of acetone and crystallizing therefrom, will form propyl-p-amino-benzoyl-acetyl salicylate, which is a yellowish crystalline powder of a low melting point.

Similarly, 205 grams of butyl-p-amino benzoate ($C_6H_4NH_2.COO.C_5H_9$), when added to 180 grams of acetyl salicylic acid in acetone and crystallized therefrom, will form butyl-p-amino benzoyl—acetyl salicylate, a white crystalline powder of low melting point.

The anesthetic solutions of the acetyl salicylates of the alkyl esters of p-amino-benzoic acid in glycol may be prepared by dissolving the desired quantities of the ready made salt in the desired volume of glycol.

These anesthetic solutions may also be more conveniently prepared by dissolving the aspirin and the particular anesthetic substance in proportion of their molecular weights in a suitable volume of glycol. The application of heat is preferable in both methods of preparation to effect and speed up solution.

To the anesthetic solutions thus prepared may be readily added any of the ingredients normally added to anesthetic solutions, such as vaso-constrictors, of the epinephrine and ephedrine groups, preservatives, antiseptics, and the like. I also find that any of the alcohols, aliphatic or aromatic, may be added to the above solutions with the usual resulting benefits derived from the addition of the particular alcohol, such as benzyl alcohol, for instance, to intensify the anesthetic effect of the solution, or chlorbutanol (chloratone) as a preservative and intensifier of anesthesia.

The following are examples of preferred anesthetic solutions of the present invention, the quantities of the reacting ingredients being given in proportion of their molecular weights.

Example 1.—8.625 grams of ethyl-p-amino-benzoyl-acetyl salicylate (Aspircaine) dissolved in 50 cc. of glycol. To this may be added 5 to 10 cc. of benzyl alcohol.

Example 2.—4.5 grams of aspirin plus 4.125 grams of benzocaine dissolved in 50 cc. of glycol, to which may be added any desirable alcohol in the amount of 5 to 10 cc.

Example 3.—4.5 grams of aspirin plus 4.5 grams of propyl-p-amino benzoate dissolved in 50 cc. of glycol to which 5 to 10 cc. of any alcohol may be added.

Example 4.—1.93 grams of butyl-p-amino benzoate plus 1.8 grams of aspirin dissolved in 15 cc. of glycol, to which may be added 2 to 5 cc. of any alcohol.

This completes the description of the anesthetic substances and solutions thereof of the present invention. It is readily apparent that the proportions herein given may be readily varied within limits without deviating from or impairing the value of the anesthetics of the present invention or the solutions thereof.

It is also readily apparent, and I wish it to be understood that the anesthetic solutions of the present invention may have added to them other ingredients for other than anesthetic purposes without affecting the anesthetic qualities or purposes of the solutions of the present invention, and therefore within the scope thereof.

It may here also be stated that glycol described herein as the solvent in the solutions of the present invention is representative of a group of glycol derivatives; its esters and ethers being equally available for the purpose, as well as diethylene glycol and its derivatives.

What I claim is:

1. As a new compound, propyl-para-aminobenzoyl—acetyl salicylate, being a yellowish crystalline powder of low melting point and having the formula of $C_6H_4NH_2.COO.C_3H_7—C_6H_4O.(CH_3.CO).COOH$.

2. As a new compound, butyl-para-aminobenzoyl—acetyl salicylate, being a white powder of low melting point and having the formula of $C_6H_4NH_2.COO.C_5H_7—C_6H_4O.(CH_3.CO).COOH$.

3. As a new anesthetic preparation, the solution of propyl-para-amino-benzoyl—acetyl salicylate in glycol.

4. As a new anesthetic preparation, the solution of butyl-para-amino-benzoyl—acetyl salicylate in glycol.

5. As a new composition of matter, a compound having the general formula of $C_6H_4NH_2.COO.R$, wherein the R stands for an alcoholic radicle, in combination with acetyl salicylic acid.

6. As a new anesthetic preparation, the compound having the general formula of $C_6H_4NH_2.COO.R$, wherein R stands for an alcoholic radicle, in combination with acetyl salicylic acid, dissolved in glycol.

7. As a new anesthetic preparation, the compound having the general formula of $C_6H_4NH_2.COO.R$, wherein R stands for an alcoholic radicle, in combination with acetyl salicylic acid in solution in a mixture of glycol and an alcohol.

8. As a new anesthetic preparation, the compound having the general formula of $C_6H_4NH_2.COO.R$, wherein R stands for an alcoholic radicle, in combination with acetyl salicylic acid dissolved in a solvent of the group of glycol, diethylene glycol, mono-ethyl ether of diethylene glycol and mono-ethyl ether of ethylene and propylene glycol.

9. The method for preparing a solution of the compound having the general formula of $C_6H_4NH_2.COO.R$, wherein R stands for an alcoholic radicle, in combination with acetyl salicylic acid, which comprises the steps of dissolving equimolecular proportions of the said compound and acetyl salicylic acid in a solvent from the group of glycol, diethylene glycol, mono-ethyl ether of diethylene glycol and mono-ethyl ether of ethylene and propylene glycol.

10. As a new anesthetic preparation, the solution of propyl-para-amino-benzoyl—acetyl-salicylate in a solvent of the group of glycol, diethylene glycol, mono-ethyl ether of diethylene glycol and mono-ethyl ether of ethylene and propylene glycol.

11. As a new anesthetic preparation, the solution of butyl-para-amino-benzoyl—acetyl-salicylate, in a solvent of the group of glycol, diethylene glycol, mono-ethyl ether of diethylene glycol and mono-ethyl ether of ethylene and propylene glycol.

12. The method of preparing a solution of propyl-para-amino-benzoyl—acetyl-salicylate which comprises the steps of dissolving equimolecular proportions of propyl-para-aminobenzoate and acetyl salicylic acid in a solvent of the group of glycol, diethylene glycol, monoethyl ether of diethylene glycol and mono-ethyl ether of ethylene and propylene glycol.

13. The method for preparing a solution of butyl-para-amino-benzoyl—acetyl-salicylate which comprises the steps of dissolving equimolecular proportions of butyl-para-aminobenzoate and acetyl salicylic acid in a solvent of the group of glycol, diethylene glycol, monoethyl ether of diethylene glycol and mono-ethyl ether of propylene and ethylene glycol.

DAVID CURTIS.